Jan. 29, 1924.
H. H. HARDERS
VULCANIZATION OF TUBES
Filed Feb. 14, 1921
1,481,902
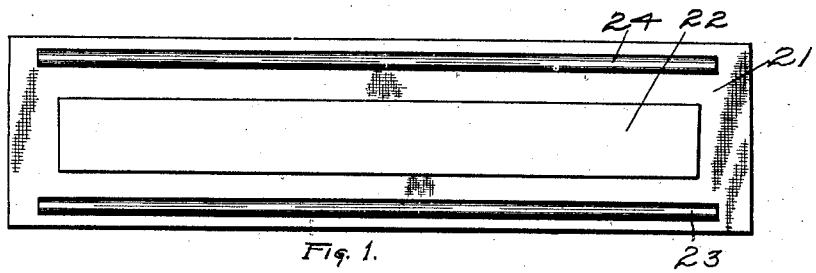
Fig. 1.
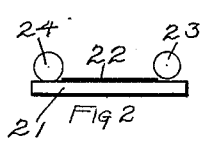 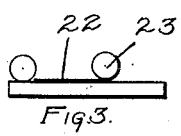 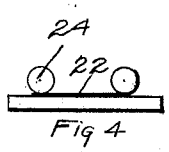 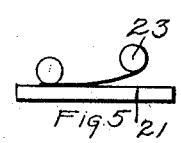
Fig 2.   Fig 3.   Fig 4.   Fig 5.
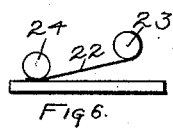 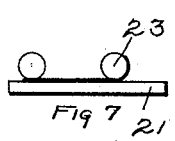 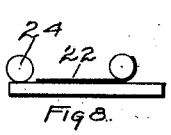 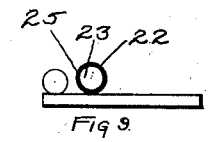
Fig 6.   Fig 7.   Fig 8.   Fig 9.
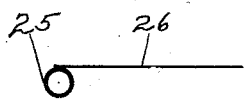 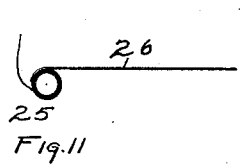 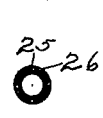
Fig. 10.   Fig. 11.   Fig 12.
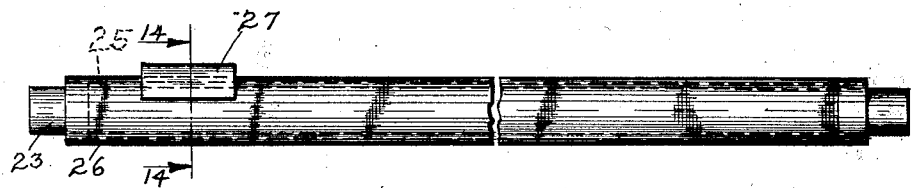
Fig 13.
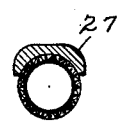
Fig. 14.
HARRY H. HARDERS
INVENTOR
BY
ATTORNEYS Patented Jan. 29, 1924.

1,481,902

UNITED STATES PATENT OFFICE.

HARRY H. HARDERS, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

VULCANIZATION OF TUBES.

Application filed February 14, 1921. Serial No. 444,778.

*To all whom it may concern:*

Be it known that I, HARRY H. HARDERS, a citizen of the United States, and a resident of Milwaukee, in the county of Milwaukee and State of Wisconsin, have invented certain new and useful Improvements in Vulcanization of Tubes, of which the following is a specification.

My invention relates to the vulcanization of tubes and the principal object of my invention is to provide a more satisfactory method of vulcanization. In the drawings accompanying this specification and forming a part thereof I have shown, for purposes of illustration, one form which my invention may assume. These drawings represent diagrammatically the various steps in the illustrative method herein described.

Figure 1 is a plan view of the apparatus.

Figures 2 to 12 inclusive are details of the various steps in the method.

Figure 13 is a side elevation of the mandrel with the jacket on.

Figure 14 is a cross section on line 14—14 of the mandrel and pressure block.

In carrying out this illustrative method the strip of gum stock 22 to be used for the tube is placed on a table 21 and adjacent this strip 22 are placed a mandrel 23 on which the strip is to be rolled and an idle mandrel 24. The position of the parts is shown in Figures 1 and 2. One operator then stands at each end of the table and the two operators roll the strip 22 about the mandrel 23 until about one-third of the strip encircles the mandrel as shown in Figure 3. The operators then place the idle mandrel 24 on the free end of the strip 22 as shown in Figure 4 and then, as shown in Figure 5, raise the mandrel 23 from the table 21 and thereafter, by holding the mandrel 24 and pulling upon the mandrel 23, stretch the strip 22 as shown in Figure 6. After this strip is stretched the mandrel 23 is replaced upon the table 21 as shown in Figure 7 and due to the roughness of the surface of this table, preferably secured by covering the table with heavy duck, the strip 22 will remain in stretched position after the mandrel 24 has been rolled off, as shown in Figure 8. The remainder of the strip 22 is then rolled about the mandrel 23 to form the completed tube 25 as shown in Figure 9.

To prepare this tube for vulcanization one end of a fabric straitjacket 26 is pressed thereon as shown in Figure 10 and wrapped about the tube to a sufficient degree to cause it to adhere firmly to the tube as shown in Figure 11. The straitjacket is then placed under tension and completely wrapped about the tube 25 while under this tension to thereby form the complete wrap about the tube. In order to provide for any inequalities and irregularities and to facilitate the later expulsion of the entrapped air I prefer to have this straitjacket cut on the bias.

In order to remove the air entrapped between the tube and the mandrel the mandrel 23 bearing the completed tube 25 and the completely wrapped straitjacket 26 is rotated and pressure applied thereto by means of a block 27 shown in Figures 13 and 14. The rotation of the tube is preferably in such direction that pressure of the block against the straitjacket will tend to further wrap the straitjacket about the tube rather than to unwrap it and the block may be made of any suitable material and shape and is preferably moved along the tube continuously from one end to the other although it is obvious that the block might be started from the middle and moved first to one end and then to the other.

It will be apparent that the method herein described eliminates the high percentage of defects which results from the use of grooved rollers moving longitudinally of the tube to expel the air and also eliminates the heavy expense due to the use of a crosswrapping to expel the air.

It will be understood that the method herein described is illustrative only and that my invention is not limited thereto.

I claim:

1. The method of preparing for vulcanization a tube which has been positioned upon a mandrel and wrapped with a straitjacket under tension, which comprises the application of pressure coincidently to a relatively small part of the surface of the tube progressively along the tube.

2. The method of vulcanizing tubes, which comprises positioning the tube upon a mandrel, applying a straitjacket under tension, applying pressure coincidently to a relatively small part of the surface of the straitjacket progressively along the tube, and vulcanizing in the absence of the pressure-applying agency.

3. The method of preparing for vulcanization a tube which has been positioned upon a mandrel, which comprises the application of pressure coincidently to a relatively small part of the surface of the tube progressively spirally along the tube.

4. The method of vulcanizing tubes, which comprises positioning the tube upon a mandrel, applying pressure coincidently to a relatively small part of the surface of the tube progressively spirally along the tube, and vulcanizing in the absence of the pressure-applying agency.

5. The method of preparing for vulcanization a tube which has been positioned upon a mandrel, which comprises progressively spirally compressing the tube against the mandrel by a compressing agency which does not thereafter hold the tube compressed against the mandrel.

6. The method of preparing for vulcanization a tube which has been positioned upon a mandrel, which comprises progressively spirally compressing the tube against the mandrel by a compressing agency operating coincidently on but a small part of the surface of the tube.

7. The method of preparing for vulcanization a tube which has been positioned upon a mandrel, which comprises progressively spirally compressing the tube against the mandrel by a compressing agency applied coincidently to but a small portion of the surface of the tube.

8. The method of vulcanizing tubes, which comprises positioning the tube upon a mandrel, progressively spirally compressing the tube against the mandrel by a compressing agency which does not thereafter hold the tube compressed against the mandrel, and vulcanizing the tube in the absence of the compressing agency.

9. The method of vulcanizing tubes, which comprises positioning the tube upon a mandrel, progressively spirally compressing the tube against the mandrel by a compressing agency operating coincidently on but a small part of the surface of the tube, and vulcanizing the tube in the absence of the compressing agency.

10. The method of vulcanizing tubes, which comprises positioning the tube upon a mandrel, progressively spirally compressing the tube against the mandrel by a compressing agency applied coincidently to but a small portion of the surface of the tube, and vulcanizing in the absence of the compressing agency.

In testimony whereof I have signed my name to the above specification.

HARRY H. HARDERS.